United States Patent [19]
Fachini et al.

[11] Patent Number: 5,191,753
[45] Date of Patent: Mar. 9, 1993

[54] HYDRAULIC DRIVE SYSTEM FOR A COTTON HARVESTER

[75] Inventors: Robert M. Fachini, Naperville, Ill.; John H. Chance; Daniel A. Miller, both of Amarillo, Tex.; David Brandt, Downers Grove, Ill.

[73] Assignee: Case Corporation, Racine, Wis.

[21] Appl. No.: 809,950

[22] Filed: Dec. 18, 1991

[51] Int. Cl.$^5$ .............................................. A01D 46/10
[52] U.S. Cl. ..................................... 56/10.9; 56/11.2; 56/30
[58] Field of Search ................... 56/30, 28, 10.9, 11.1, 56/11.2, 11.9

[56] References Cited

U.S. PATENT DOCUMENTS

| | | | |
|---|---|---|---|
| 3,992,858 | 11/1976 | Hubbard et al. | 56/11.9 X |
| 4,255,919 | 3/1981 | Copley et al. | 56/30 |
| 4,335,561 | 6/1982 | Swanson et al. | 56/11.9 X |
| 4,570,425 | 2/1986 | Carr | 56/11.9 X |
| 4,594,840 | 6/1986 | D'Almeida et al. | 56/11.2 |
| 4,803,830 | 2/1989 | Junge et al. | 56/28 |
| 4,896,491 | 1/1990 | Warnsholz et al. | 56/28 |

Primary Examiner—Terry Lee Melius
Attorney, Agent, or Firm—Dressler, Goldsmith, Shore, Sutker & Milnamow, Ltd.

[57] ABSTRACT

A hydraulic drive system for driving component parts such as harvesting units of a cotton harvester head assembly. The hydraulic drive system includes a source of actuating fluid and fluid pressure actuators for driving the harvesting units independently of each other. Suitable conduit structure connects each fluid pressure actuator to the source of actuating fluid. The conduit structure is preferably flexible to facilitate transverse positioning of the harvesting units on the head assembly. A control valve assembly is connected to the conduit structure and is operably interposed between the source of actuating fluid and the fluid pressure actuators for selectively interrupting and effectuating the supply of actuating fluid from the source of actuating fluid and each of the fluid pressure actuators thereby influencing operation of the harvesting units.

19 Claims, 4 Drawing Sheets

HYDRAULIC DRIVE SYSTEM FOR A COTTON HARVESTER

FIELD OF THE INVENTION

The present invention generally relates to cotton harvesters and, more particularly, to a system for hydraulically driving component parts arranged on a harvesting head assembly of the cotton harvester.

BACKGROUND OF THE INVENTION

Cotton harvesters typically include a harvesting head assembly for harvesting crop materials as the harvester is driven across a field. The harvesting head assembly is supported by and transversely extends across the harvester. A typical head assembly mounts a plurality of harvesting units and a rotatable auger mechanism for collecting materials harvested by the harvesting units.

Each harvesting unit includes a fore-and-aft housing assembly which encloses a rotatable harvesting mechanism. The harvesting mechanism of the harvesting unit can take different forms. In cotton stripper type harvesters, the housing assembly of each harvesting unit defines a plant passage with rotatably driven brushes arranged on opposite sides thereof for stripping the crop materials from the plants as the harvester is driven across the field.

A typical auger mechanism includes a transversely elongated auger mounted for rotation on the head assembly and extending rearwardly of and beneath the harvesting units. A conventional auger has left and right hand spiral sections. Thus, when the auger is rotatably driven it moves the materials received from the harvesting units toward a discharge area of the head assembly.

The head assembly further includes a drive mechanism for driving the harvesting units and the auger mechanism. The drive mechanism for the harvesting units typically includes a telescoping shaft assembly extending rearwardly from each harvesting unit. A forward end of the shaft assembly is connected to the harvesting mechanism of a harvesting unit. The rear or aft end of the shaft assembly is connected to and driven by a drive pulley carried on a frame of the head assembly. Each shaft assembly includes telescoping shaft sections as well as front and rear universal joints for accommodating movement of the harvesting units. A separate drive arrangement is provided for driving the rotatable auger mechanism.

Each harvesting unit is supported on the head assembly through an attaching mechanism toward a rear end of the unit. The attaching mechanism is designed to allow for transverse movement of the respective harvesting unit to adjust for different row spacings between the units thereby facilitating harvesting of materials from plants arranged in numerous combinations of row spacings. The harvesting units may likewise be transversely moved for inspection and servicing of the rotatable harvesting mechanism of each harvesting unit.

The size and weight of the harvesting units makes it difficult and cumbersome to adjust their transverse position on the head assembly. Positioning and adjusting of the harvesting units is further complicated by the weight and presence of the telescoping drive shaft assembly extending therefrom. Moreover, the mechanism for transferring power between adjacent drive shaft assemblies requires different parts each time an adjustment in the transverse positioning of the harvesting units is effected. The excess time and added inventory costs involved with modification of conventional harvester drive systems is apparent. The complex mechanical interconnection inherent with the drive arrangement vertically extending to the auger mechanism further complicates the drive system for the cotton harvester.

SUMMARY OF THE INVENTION

In view of the above, and in accordance with the present invention, there is provided a hydraulic drive system for driving component parts such as harvesting units of a cotton harvester head assembly. The hydraulic drive system of the present invention includes a source of operating fluid and fluid pressure actuators for driving the harvesting units independently of each other. Suitable conduit structure connects each fluid pressure actuator to the source of operating fluid. In the preferred form of the invention, the conduit structure is flexible to facilitate transverse positioning of the harvesting units on the head assembly. A control valve assembly is connected to the flexible conduit structure and is operably interposed between the source of operating fluid and each of the fluid pressure actuators for selectively interrupting and effectuating the supply of operating fluid from the operating source to each of the fluid pressure actuators thereby influencing operation of the harvesting units.

In a preferred form of the invention, the control valve assembly includes electro/hydraulic circuitry for selectively controlling operation of each harvesting unit. The electro/hydraulic circuitry means includes mode select means for selectively conditioning the harvesting units to operate between forward, neutral, and reverse operating modes and, respectively, providing forward, neutral, and reverse mode signals representative thereof. The electro/hydraulic circuitry further includes hydraulic logic means responsive to signals from the mode select means and arranged between the source of operating fluid and each of the motors for inhibiting operation of the harvesting units in response to the mode select means assuming a neutral position while selectively allowing forward or reverse operation of the harvesting units in response to the mode select means being moved into respective forward or reverse positions.

The source of operating fluid preferably comprises a fluid reservoir mounted on the harvester and a hydraulic pump. In a most preferred form of the invention, a variable displacement pump is provided to draw fluid from the reservoir and supply operating fluid under pressure to each of the fluid pressure actuators.

In the preferred form, the logic means of the electro/hydraulic circuitry includes a forward valve assembly connected to the source of operating fluid and which selectively operates between neutral and forward positions. The forward valve assembly includes a selectively movable valve which influences operation of a pair of pressure responsive shift valves and, ultimately, controls operation of the fluid actuators in a forward direction. The hydraulic circuitry further includes a reverse valve assembly connected to the source of operating fluid and which selectively operates between neutral and reverse positions. The reverse valve assembly includes a selectively movable valve which influences operation of a pair of pressure responsive shift valves and, ultimately, controls operation of the fluid actuators in a reverse direction.

Each fluid pressure actuator of the drive system is preferably configured as a hydraulically driven motor which is connected to the rotatable harvesting mechanism of a harvesting unit. When fluid is directed to one port of the hydraulic motor, the harvesting mechanism rotates in a first or forward direction. When fluid is delivered through the conduit structure to an opposite port on the hydraulic motor, the harvesting mechanism is driven in a second or reverse direction.

The cotton harvester of the present invention may further include an auger mechanism which extends rearwardly of the harvesting units on the head assembly. A separate fluid pressure actuator is provided to drive the auger mechanism of the head assembly. In a preferred form of the invention, the fluid pressure actuator for driving the auger mechanism likewise includes a hydraulically driven motor which rotates the auger mechanism in a first direction when fluid is directed to one port on the motor and is reversible when fluid is delivered to an opposite port of the motor.

The hydraulic control valve assembly of the present invention further includes means for independently adjusting the speeds of the harvesting units. To effect such ends, adjustable flow control orifices are arranged upstream of the fluid pressure actuators for selectively controlling the operational speed of the harvesting mechanism. As will be appreciated, the size of the orifice controls the flow therepast and thereby the rotational speed of the mechanism driven thereby.

The hydraulic drive system of the present invention allows the harvesting mechanisms to be readily operated in forward, neutral, or reverse conditions by merely changing the state of the mode selector. Moreover, the flexibility of the conduit structure facilitates transverse adjustment of the harvesting units with minimal effort and eliminates replacement of parts heretofore required of harvesting unit drive systems. The present invention further provides a simplified apparatus for driving the auger mechanism in either forward or reverse positions. Unlike conventional drive systems, the present invention further provides for substantially infinite and independent control of the operating drive speed for the harvesting units and, if desired, the auger mechanism.

Numerous other features and advantages of the present invention will become readily apparent from the following detailed description, the accompanying drawings, and the appended claims.

DETAILED DESCRIPTION OF THE INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Figure 1:
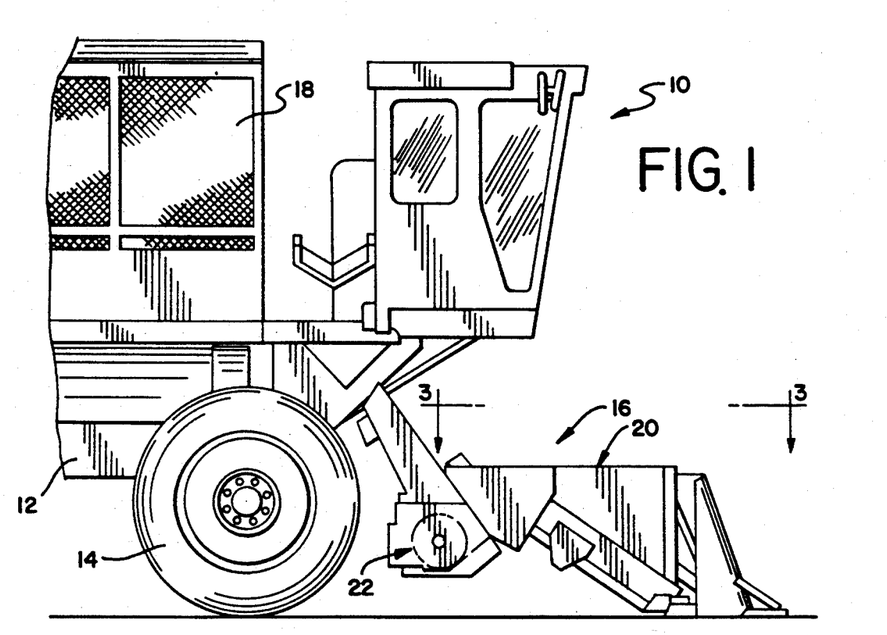
FIG. 1 is a fragmentary side elevational view of a cotton harvester embodying features of the present invention.

Referring now to the drawings, wherein like reference numerals indicate like parts throughout the several views, in FIG. 1 there is schematically illustrated a cotton harvester 10 including a fore-and-aft extending mobile chassis or frame 12 supported for movement across a field of cotton plants by front and rear pairs of wheels 14, with only one wheel being illustrated for purposes of this description. A harvesting head assembly 16 is mounted on the chassis 12 for harvesting cotton materials from generally parallel rows of cotton plants as the harvester is driven across the field. In the illustrated embodiment, a receptacle 18 is mounted on the chassis 12 for receiving cotton materials from the head assembly 16.

The harvesting head assembly 16 extends across and is supported on the chassis 12 of the harvester for generally vertical movement. A plurality of harvesting units 20 are individually mounted on the head assembly 16. A conventional rotatably driven auger mechanism 22 is likewise mounted on the head assembly 16 for collecting materials harvested by the harvesting units 20.

Figure 2:
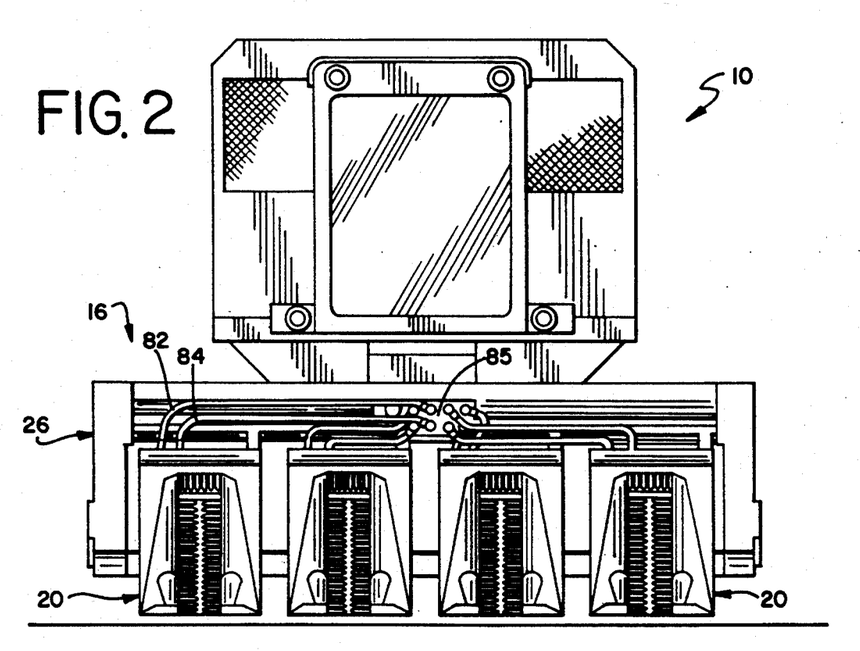
FIG. 2 is a front elevational view of the cotton harvester illustrated in FIG. 1.

As shown in FIG. 2, the harvesting units are preferably arranged in side-by-side relation for harvesting materials as the harvester is driven across the field. As is conventional, one or more harvesting units are arranged to one side of the longitudinal center of the harvester while one or more harvesting units are arranged on an opposite side of longitudinal center of the harvester. As many as six harvesting units may be laterally arranged across the harvester to receive a like number of rows of cotton plants.

Figure 3:
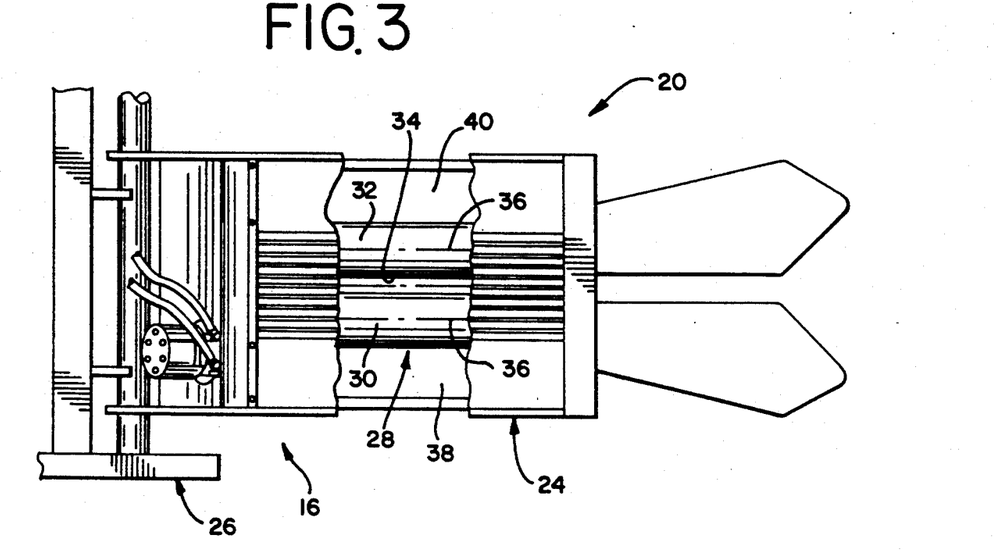
FIG. 3 is an enlarged top plan view of a harvesting unit of the cotton harvester.

As shown in FIG. 3, each harvesting unit 20 includes a housing assembly 24 which is attached toward a rear end thereof to a transverse frame 26 of the head assembly 16. In the illustrated embodiment, each harvesting unit includes a rotatable harvesting mechanism 28 which is of a conventional brush-roll type. That is, the harvesting mechanism 28 includes a pair of spaced rotatable brush rolls 30 and 32 which define an elongated fore-and-aft plant passage 34 therebetween and through which rows of cotton plants pass so as to allow the brush-rolls 30 and 32 to strip materials therefrom as the harvester is driven through the field. Each brush-roll 30, 32 is adapted to rotate about a fixed fore-and-aft axis 36. Conventional augers 38 and 40 are also rotatably mounted within the housing assembly 24 on axes extending generally parallel to the axes of the brush-rolls 30 and 32. The augers 38 and 40 receive stripped plant materials from the brush-rolls 30 and 32, respectively, and rearwardly advance the materials toward a rear end of a respective harvesting unit from whence the plant materials are exhausted toward the auger mechanism 22 (FIG. 1) on the head assembly 16.

Figure 4:
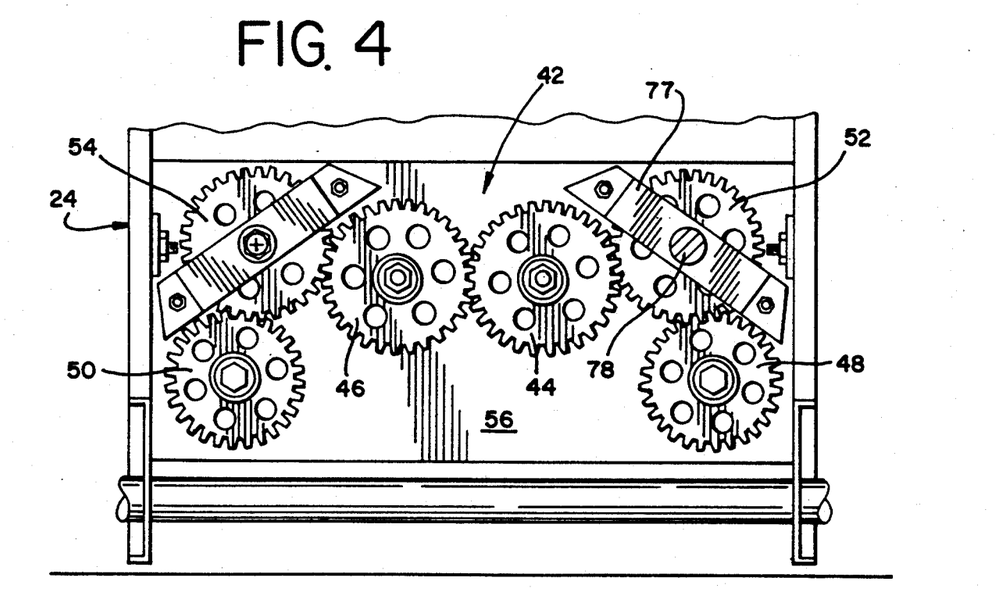
FIG. 4 is a fragmentary and enlarged rear elevational view of a gear mechanism for driving a harvesting mechanism of a harvesting unit.

A drive mechanism 42 is provided for positively driving the brush-rolls 30, 32 and augers 38, 40 of each harvesting unit. As shown in FIG. 4, drive mechanism 42 includes a pair of intermeshing brush-roll drive gears 44 and 46 and a pair of auger drive gears 48 and 50. As will be appreciated, gears 44, 46 are fixedly connected to respective drive shafts of each brush-rolls 30, 32, respectively, while gears 48, 50 are fixedly secured to respective drive shafts of each auger 38, 40. A pair of idler gears 52 and 54 are provided to rotatably interconnect the brush-roll drive gears 44 and 46 with the auger drive gears 48 and 50, respectively. All of the gears of the drive mechanism 42 are separated from the brush-rolls and augers by a support assembly 56 forming part of the housing assembly 24 of each harvesting unit.

What has been heretofore described is a substantially conventional structure on a cotton harvester or cotton stripper which is known is the art. The salient features of the present invention relate to a hydraulic system for driving the component parts arranged on the harvesting head assembly 16 of the cotton harvester. The hydraulic drive system of the present invention, generally designated by reference numeral 60 in FIG. 5, includes a source of operating fluid 62, a fluid pressure actuator 64 for individually driving each harvesting unit of the harvester, conduit structure 66 for connecting each fluid pressure actuator to the source of operating fluid, and control means 68 arranged in combination with the conduit structure 66 and connected between the source of operating fluid 62 and each fluid pressure actuator 64 for selectively interrupting and effectuating the supply of operating fluid from the operating source to each fluid pressure actuator thereby influencing operation of the rotatable mechanisms driven thereby.

Figures 5, 6:
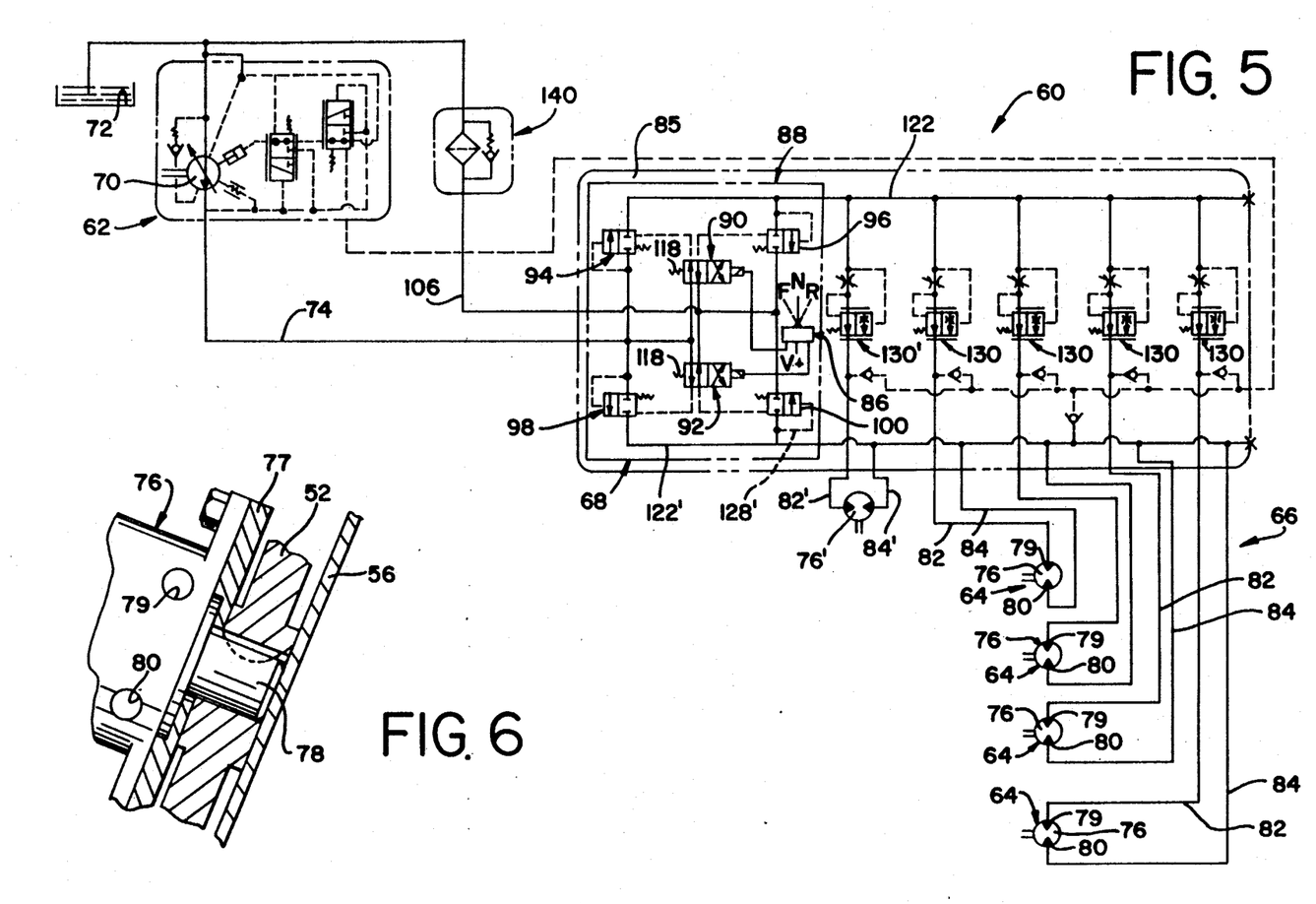
FIG. 5 is a schematic illustration of a hydraulic drive system embodying teachings of the present invention.
FIG. 6 is an enlarged partial sectional view of a fluid actuator forming part of the hydraulic driving system.

In the illustrated embodiment, the source of operating fluid 62 includes a variable displacement pump 70. Pump 70 is driven during operation of the harvester by a suitable power source on the harvester and is responsive to pressures within the hydraulic system. The intake port of pump 70 is connected to a fluid reservoir 72 arranged on the frame of the harvester. During pump operation, an actuating fluid of sufficient pressure is exhausted from a pump outlet into a fluid supply line 74 connected to the pump outlet.

In the illustrated embodiment, the fluid pressure actuator 64 for each harvesting unit preferably includes a hydraulic drive motor 76. As shown in FIG. 6, each motor 76 is suitably affixed to an upstruck bracket 77 forming part of the support assembly 56 on each harvesting unit and has an output shaft 78 connected and adapted to drive idler gear 52 of the harvesting unit drive mechanism 42. As will be appreciated, the hydraulic motor 76 could likewise drive any of the gears in the drive mechanism 42 since all the gears are arranged in intermeshing relation relative to each other. Each motor 76 includes ports 79 and 80. When fluid is supplied to port 79, port 80 acts as an exhaust port, and the motor is driven in a first direction. Conversely, when fluid is supplied to port 80, port 79 acts as an exhaust port, and the motor is driven in a second direction which is opposed to the first direction. As will be appreciated, the operative direction of the motor 76 likewise controls the operational mode of the harvesting mechanism of each harvesting unit.

The conduit structure 66 includes a pair of conduits or fluid lines 82 and 84 extending from the ports 79 and 80, respectively, of each motor 76. In a preferred form of the invention, at least a portion of each fluid line 82, 84 is formed of flexible tubing to facilitate transverse movement of the harvesting units on the head assembly and thereby promoting the ability to transversely shift the harvesting units to accommodate differences in row spacings.

The control means 68 preferably includes a valve body 85 mounted on the harvester and which embodies electro/hydraulic circuitry for selectively controlling operation of the harvesting units. The electro/hydraulic circuitry includes mode select means for selectively conditioning the harvesting units to operate between forward, neutral, and reverse operational modes. In a preferred form of the invention, the mode select means includes a switch 86 connected to an electrical power source V+ such as the electrical system of the harvester and to logic circuitry 88 incorporated into the electro/hydraulic circuitry of the control system.

Switch 86 is preferably located in a cab region of the harvester and is designed as a three position, (forward, neutral, and reverse) switch. When moved to a forward position (F), switch 86 provides a signal representative of a forward mode of operation to the logic circuitry 88. When moved to a reverse position (R), switch 86 provides a signal representative of a reverse mode of operation to the logic circuitry 88. Likewise, when moved to a neutral position, switch 86 provides a signal indicative of a neutral mode of operation to the logic circuitry 88.

The logic circuitry 88 of the control system includes a forward valve assembly 90 and a reverse valve assembly 92. As will be explained in detail hereinafter, forward valve assembly 90 operates in combination with a pair of fluid pressure responsive shift valves 94 and 96, while reverse valve assembly 92 operates in combination with a pair of fluid pressure responsive shift valves 98 and 100.

Figure 7:
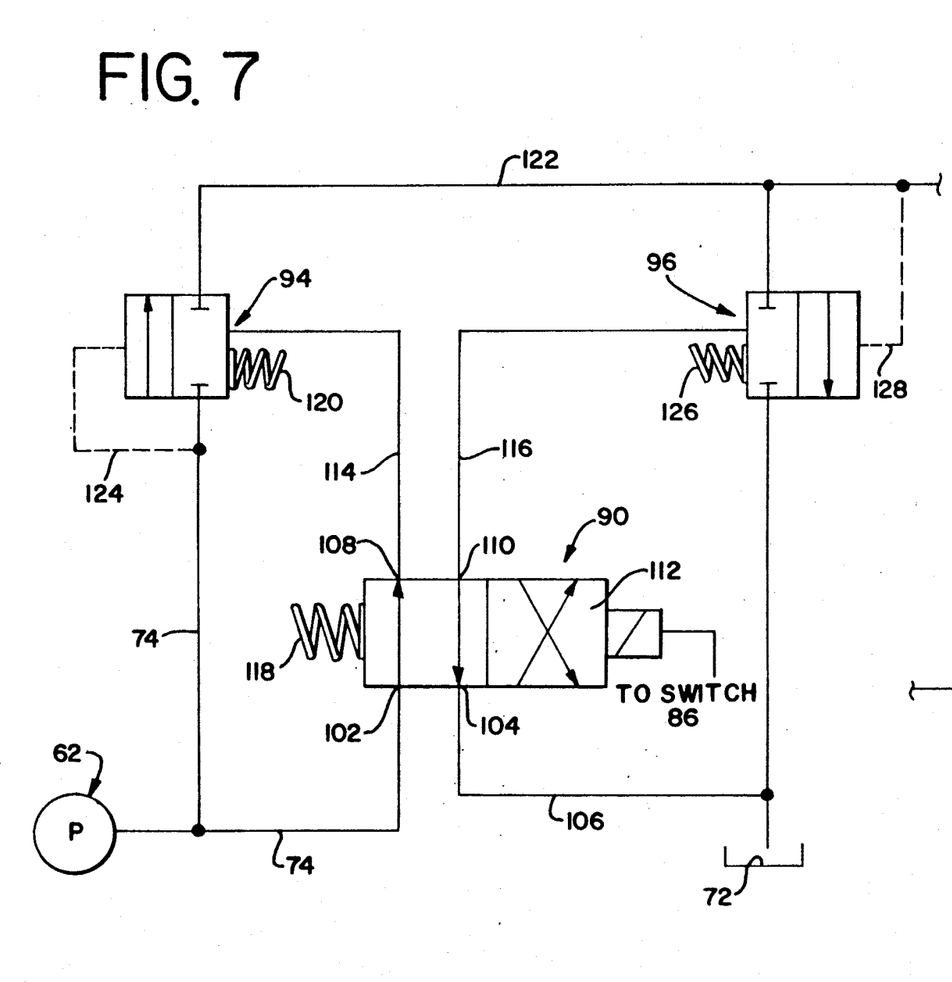
FIG. 7 is a schematic view of a portion of the hydraulic drive system.

The forward and reverse valve assemblies 90 and 92 are substantially similar to each other. Accordingly, only valve assembly 90 will be discussed in detail with the understanding that valve assembly 92 is substantially similar. As shown in FIG. 7, each valve assembly is preferably configured as a two-position electrically responsive solenoid valve. Each valve assembly includes an inlet port 102 connected to the supply line 74, leading from the source of operating fluid 62, an exhaust port 104 which opens to an exhaust line 106, and ports 108 and 110. The flow of hydraulic fluid between ports 102, 104 and ports 108, 110 is controlled by a spring biased valve element 112. Port 108 of valve assembly 90 is connected to shift valve 94 via line 114 while port 110 is connected to shift valve 96 via line 116.

In the illustrated embodiment, the valve element 112 of each valve assembly is rightwardly biased under the influence of biasing means 118 into a neutral position shown in solid lines in FIG. 7. In the neutral position, a flow path is established between inlet port 102 and port 108 thus allowing pressurized fluid to be directed to shift valve 94. In the neutral position, port 110 of each valve assembly is open to exhaust.

When the valve assembly is energized, the valve element 112 moves leftwardly against the action of the biasing means 118 to an operative position wherein the inlet port 102 is joined to port 110 thus allowing pressurized fluid to be directed to shift valve 96 while opening port 108 to exhaust.

Line 114 is connected to the shift valve 94 such that it can supply pressurized fluid to an area thereof and in a manner assisting a spring 120 to normally urge valve 94 into a closed position. When in a closed position, valve 94 prevents fluid flow into a motor conduit 122 leading from shift valves 94 and 96. Each of the fluid lines 82 of the conduit structure 66 leading to port 79 of the drive motors 76 branch off the motor conduit 122. Each of the fluid lines 84 of the conduit structure and leading to port 80 of motors 76 branch off a similar motor conduit 122' leading from shift valves 98 and 100.

Branching off the supply line 74 is a pilot passage 124 which is connected to the shift valve 94 such that it can supply pressurized fluid to an area thereof, which area is in direct opposition to the spring 120 and the fluid pressure supplied to valve 94 via line 114. As the pressure within the pilot passage 124 overcomes the opposition forces supplied by spring 120 and the fluid pressure within line 114, valve 94 will shift toward an open position thereby permitting pressurized fluid to flow from the pressurized source 62 and into the motor conduit 122.

Line 116 is connected to shift valve 96 such that it supplies pressurized fluid to an area thereof and in a manner assisting a spring 126 to normally urge valve 96 into a closed position. When in a closed position, valve 96 disconnects motor conduit 122 from exhaust. Branching off the motor conduit 122 is a pilot passage 128 which is connected to the shift valve 96 such that it supplies pressurized fluid to an area thereof, which area is in direct opposition to the spring 126 and the fluid pressure supplied to valve 96 via line 116. As the pressure within the pilot passage 128 overcomes the opposition forces of spring 126 and fluid pressure within line 116, valve 96 will shift to an open position thereby connecting the motor conduit 122 to exhaust.

The hydraulic drive system 60 also can include adjustable flow control orifices 130 for regulating the fluid flow to the motors 76 and thereby setting or controlling the operational speeds of the harvesting units. The ability to adjust the flow of actuating fluid to each motor 76 compensates for wear of motor components and/or wear between the intermeshing gears of the drive mechanism 42. Moreover, the control orifice 130 can be closed to inhibit operation of the respective motor while allowing other motors to continue to operate. In the illustrated embodiment, the flow control orifices 130 are arranged downstream of the logic circuitry 88 and upstream of each of the motors 76.

Figure 8:
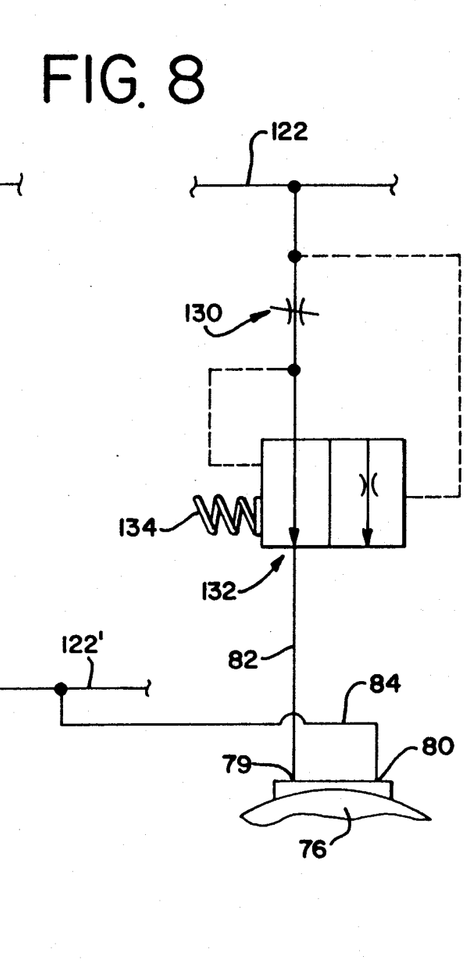
FIG. 8 is a schematic view of another portion of the hydraulic drive system of the present invention.

Each flow control orifice 130 is substantially similar and thus only one will be described in detail with the understanding that other flow control orifices are substantially similar. As shown in FIG. 8, each flow control orifice 130 is preferably arranged along the fluid line 82 branching off motor conduit 122 and leading to port 79 of motor 76. Preferably, each orifice 130 is disposed to regulate operation of the harvesting unit in a forward mode of operation. As shown, the flow control orifice 130 has arranged in combination therewith a pressure responsive valve 132 which is normally biased under the influence of a spring 134 into a first position. When valve 132 is in a first position, fluid flow therethrough is substantially unrestricted. When valve 132 shifts to a second position, fluid flow therethrough is restricted. The position of valve 132 is responsive to fluid pressures on opposite sides of the respective orifice 130.

Returning to FIG. 5, an additional hydraulic motor 76' can be provided to drive the auger mechanism on the head assembly. Hydraulic motor 76' is substantially similar to the hydraulic motors 76. Suitable conduit structure including flexible tubing 82' and 84' connects the motor 76' to the control system for operation. As shown, tubing 82' branches from motor conduit 122 while tubing 84' branches from motor conduit 122'. Accordingly, operation of motor 76' will preferably correspond with operation of the other motors 76 in the hydraulic system. The control system can further include orifice structure 130' similar to that discussed in detail above for regulating operation of the hydraulic motor 76' and, thereby, the auger mechanism 22.

Operation of the hydraulic drive system will now be explained starting from a position wherein the harvesting units are conditioned in a neutral operational mode. To achieve a neutral operational mode, switch 86 is moved into a neutral position. When switch 86 is in a neutral position, valve assemblies 90 and 92 are positioned as shown in solid lines in FIG. 5 under the influence of the respective springs 118.

With each valve assembly 90, 92 positioned as shown, actuating fluid from the pressurized fluid source 62 is passed through each valve assembly 90, 92 across the joined ports 102, 108 thereby urging the respective shift valves 94 and 98 associated with valve assemblies 90 and 92, respectively into a closed position. Thus, actuating fluid delivered to the shift valves 94 and 98 through the supply line 74 from fluid source 62 is prevented from reaching the motors 76 and 76'. The respective shift valves 96 and 100 for valve assemblies 90 and 92, respectively, are likewise maintained in a closed position under the influence of the respective springs 126 associated with each shift valve.

A forward operational mode is readily and easily achieved for the harvesting units simply by changing the state of the switch 86 into a forward position. When switch 86 is in a forward position, a forward operational mode signal is delivered to the forward solenoid valve assembly 90 thereby shifting the valve leftwardly. When valve assembly 90 is shifted leftwardly, port 102 thereof is connected to port 110, and actuating fluid is directed to shift valve 96 whereby maintaining the valve 96 in a closed position. Shifting the valve assembly 90 leftwardly, likewise opens port 108 thereof to exhaust. As the pressure within the supply line 74 builds, it will be sensed at the shift valve 94 via the pilot passage 124. The increase in pressure within the pilot passage 124 will eventually overcome the force of spring 120, and since port 108 is open to exhaust, the shift valve 94 will move toward its open position thereby permitting actuating fluid from the fluid pressure source 62 to pass into motor conduit 122 from whence the actuating is directed to the motors 76 and 76' through the conduit structure.

Notably, the reverse valve assembly 92 remains in the position shown in solid lines in FIG. 5 after a forward operational mode has been selected by the operator. Thus, shift valve 98 is maintained in a closed position under the influence of actuating fluid from supply line 74 passing through the valve assembly 92 and being applied against the shift valve 98. With valve assembly 92 in the position shown in FIG. 5, shift valve 100 is open to exhaust. Accordingly, the pressurized fluid returning from the motors 76 and 76' through motor conduit 122' is sensed by the pilot passage 128' of shift valve 100. As the pressure within the pilot passage 128' increases, and because shift valve 100 is open to exhaust, the increased pressure in pilot passage 128 moves shift valve 100 into its open position thereby opening motor conduit 122' to exhaust and thereby completing the hydraulic flow circuit for driving the harvesting units and auger mechanism in a forward direction. As shown, a suitable return filter 140 preferably filters the fluid being returned to the reservoir.

In a reverse operational mode, switch 86 is moved into a reverse position. In a reverse position, the switch 86 provides a reverse mode signal which is delivered to the reverse solenoid valve assembly 92 and the forward valve assembly 90 is allowed to return to the solid line position shown in FIG. 5.

Operation of the hydraulic drive system in a reverse operational mode will be substantially the reverse of that discussed above with respect to operation of the harvesting units in a forward operational mode. Thus, it being understood that pressurized fluid flow is provided to the opposite side of each of the motors 76, 76' in a manner driving same in a reverse direction. When the forward valve assembly 90 returns to the solid line position shown in FIG. 5, valve 96 is allowed to shift thereby opening motor conduit 122 to exhaust and thereby completing the hydraulic flow circuit for driving the harvesting units and auger mechanism in a reverse direction.

The provision of the flow control orifices 130 and 130' promotes adjustable control over the harvesting operation. As will be appreciated, adjusting the flow control orifices 130 and 130' regulates the speed of the motors 76 and 76, respectively,' and thereby the operational speed of the harvesting units and the auger mechanism.

The hydraulic drive system 60 of the present invention furthermore promotes adjustability of the harvesting units relative to the frame of the harvester. The flexible tubing 82, 84 associated with the conduit structure 66 leading to the motors 76 on each harvesting unit allows for greater latitude in the positioning of the harvesting units on the head assembly and is far less weighty than heretofore known drive shaft telescoping assemblies.

Moreover, operation of the harvesting units is readily facilitated in forward, neutral, or reverse modes of operation. The provision of the electrohydraulic circuitry associated with the hydraulic drive system easily and readily allows for changes in the operational modes of the harvesting units merely by changing the state of switch 86. Providing the switch 86 in the cab region of the harvester readily allows the operator to quickly change the operational state of the harvesting units to clear jams or other inherent problems in the harvesting units during the harvesting operation. Moreover, the design of the hydraulic drive system readily allows additions to the valve body 85 for controlling additional hydraulic motors for driving other or additional rotational mechanisms. Thus, the hydraulic drive system of the present invention readily allows for add-on features.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

What is claimed is:

1. A system for hydraulically driving harvesting units of a cotton harvester, each harvesting unit including a rotatable harvesting mechanism for removing cotton from plants as the harvester is driven across a field, said hydraulic driving system comprising:

means mounted on the harvester for generating an actuating fluid pressure;

at least one fluid pressure driven motor mounted on each harvesting unit for individually driving the rotatable harvesting mechanism thereof in forward and reverse directions;

conduit means for directing fluid between each driven motor and an output of said actuating fluid pressure generating means; and electro/hydraulic control means connected between the output of said actuating fluid pressure generating means and each of said motors for selectively and conjointly controlling the rotational direction of said motors and thereby controlling the harvesting mechanisms driven thereby, said control means including first selectively actuatable ON/OFF electro/hydraulic valve means carried on the harvester for controlling actuating fluid pressure flow to each of said motors thereby selectively driving the harvesting mechanism of the harvesting units in a forward direction, and second selectively actuatable ON/OFF electro/hydraulic valve means carried on the harvester for controlling actuating fluid pressure flow to each of said motors thereby selectively driving the harvesting mechanism of the harvesting units in a reverse direction.

2. The drive system according to claim 1 wherein said first electro/hydraulic valve means includes a valve having first and second ports along with a valve element movable between a neutral position and a forward position, the position of said valve element controlling forward operation of each of the motors.

3. The drive system according to claim 2 wherein said first valve means further includes a pair of shift valves which are each pressure responsive to the position of said valve and which influence operation of the hydraulic motors.

4. The drive system according to claim 1 wherein said second electro/hydraulic valve means includes a valve having first and second ports along with a valve element movable between a neutral position and a reverse position, the position of said valve element controlling reverse operation of each of the motors.

5. The drive system according to claim 4 wherein said second valve means further includes a pair of shift valves which are each pressure responsive to the position of said valve and which influence operation of the hydraulic motors.

6. The drive system according to claim 1 further including a series of flow control orifices arranged upstream of the motors for selectively controlling operational speeds of the motors.

7. A system for individually driving a plurality of harvesting units mounted on a head assembly of a cotton harvester, said driving system comprising:

a source of operating fluid mounted on the harvester;

at least one fluid pressure actuator for driving each harvesting unit independently of the other harvesting units;

flexible conduit structure for connecting each fluid pressure actuator to said source of operating fluid, said flexible conduit structure facilitating transverse movement of the harvesting units on said head assembly; and a pair of electro/hydraulically operated ON/OFF valve means operably interposed between said source of operating fluid and each of said fluid pressure actuators for selectively and simultaneously interrupting and effectuating the supply of operating fluid from the operating fluid source to each of said fluid pressure actuators thereby influencing operation of the harvesting units in forward, neutral, and reverse modes of operation.

8. The cotton harvester drive system according to claim 7 wherein said source of operating fluid comprises a fluid reservoir mounted on the harvester and a variable displacement pump which draws fluid from the reservoir and supplies operating fluid under pressure to each of said fluid pressure actuators.

9. The cotton harvester drive system according to claim 7 further including operator adjustable means arranged in combination with said valve means for hydraulically and individually regulating the fluid flow to said motors thereby selectively controlling independent operating speeds of said harvesting units.

10. The cotton harvester drive system according to claim 7 wherein each of said ON/OFF valve means includes a first selectively actuatable valve assembly for controlling operation of said harvesting units in a forward operational direction, and a second selectively actuatable valve assembly for controlling operation of said harvesting units in a second reverse operational direction.

11. A system for hydraulically driving a plurality of harvesting units of a cotton harvester, each harvesting unit including a picker mechanism rotatably mounted thereon to remove cotton from plants, said hydraulic drive system comprising:
- a pressurized fluid source mounted on the harvester;
- a hydraulic motor mounted on each harvesting unit for driving said picker mechanism, each motor being independently driven from motors on other harvesting units; and
- electro/hydraulic circuitry means for selectively controlling operation of the picker mechanism of the harvesting units, said circuitry means including mode select means for selectively conditioning said harvesting units to operate between forward, neutral, and reverse operational modes and respectively providing forward, neutral, and reverse mode signals representative thereof, and hydraulic logic means being responsive to signals from said mode select means, said hydraulic logic means being arranged between said pressurized fluid source and each of said hydraulic motors for inhibiting rotation of the picker mechanism on each harvesting unit in response to the provision of a neutral mode signal from said mode select means while allowing said hydraulic motors to drive said picker mechanisms in a forward operational mode or a reverse operational mode in response to respective forward or reverse mode signals being received from said mode select means.

12. The hydraulic driving system according to claim 11 wherein said hydraulic logic means includes forward valve means movable between a neutral position whereat the valve means blocks fluid flow between said pressurized fluid source and each of said motors and a forward position whereat the valve means permits fluid flow between said pressurized fluid source and each of the motors thereby conditioning the harvesting units to operate in a forward operational mode.

13. The hydraulic driving system according to claim 12 wherein the forward valve means comprises a solenoid actuated valve arranged in combination with a plurality of pressure responsive valves.

14. The hydraulic driving system according to claim 11 wherein said hydraulic logic means includes reverse valve means movable between a neutral position whereat the valve means blocks fluid flow between said pressurized fluid source and each of said motors and a reverse position whereat the valve means permits fluid flow between said pressurized fluid source and each of the motors thereby conditioning the harvesting units to operate in a reverse operational mode.

15. The hydraulic driving system according to claim 14 wherein the reverse valve means comprises a solenoid actuated valve arranged in combination with a pair of pressure responsive valves.

16. The hydraulic driving system according to claim 11 wherein said electro/hydraulic circuitry further includes adjustable flow control orifices arranged between said hydraulic logic means and said motors for controlling operational speeds of said motors and thereby the picker mechanisms driven thereby.

17. A hydraulic drive system for individually driving a plurality of harvesting units and a rotatable auger mechanism mounted on a cotton harvester, said hydraulic drive system comprising:
- a source of operating fluid mounted on the harvester;
- at least one hydraulic motor for individually driving each harvesting unit and the auger mechanism;
- flexible conduit structure for connecting each hydraulic motor to said source of operating fluid; and
- control means for operating said motors, said control means including a pair of electro/hydraulic valve assemblies operably interposed between said source of operating fluid and each of said hydraulic motors for selectively and simultaneously interrupting and effectuating the supply of operating fluid from the operating fluid source to each of said fluid pressure actuators thereby influencing operation of the harvesting units and the auger mechanism in forward, neutral and reverse modes of operation.

18. The hydraulic drive system according to claim 17 wherein each electro/hydraulic valve assembly includes a solenoid operated hydraulic valve arranged in combination with a pair of valves whose positions are influenced by fluid pressures applied thereto from said solenoid valve for regulating operation of said harvesting units and said auger mechanism.

19. The hydraulic drive system according to claim 17 wherein said control means further includes an operator adjustable flow control orifice associated with each hydraulic motor for regulating the operation thereof.

* * * * *